United States Patent
Capozzi et al.

(10) Patent No.: US 9,926,979 B2
(45) Date of Patent: Mar. 27, 2018

(54) SEALING DEVICE FOR ROLLING BEARING UNIT

(71) Applicants: Marco Giovanni Francesco Capozzi, Turin (IT); Christian Kogler, Oberkurzheim (AT)

(72) Inventors: Marco Giovanni Francesco Capozzi, Turin (IT); Christian Kogler, Oberkurzheim (AT)

(73) Assignee: AKTIEBOLAGET SKF, Gothenburg (SE)

( * ) Notice: Subject to any disclaimer, the term of this patent is extended or adjusted under 35 U.S.C. 154(b) by 7 days.

(21) Appl. No.: 15/256,810

(22) Filed: Sep. 6, 2016

(65) Prior Publication Data

US 2017/0067511 A1 Mar. 9, 2017

(30) Foreign Application Priority Data

Sep. 3, 2015 (IT) .................. 102015000048377

(51) Int. Cl.
| | | |
|---|---|---|
| *F16C 33/76* | (2006.01) | |
| *F16C 33/78* | (2006.01) | |
| *F16C 19/38* | (2006.01) | |
| *F16C 19/54* | (2006.01) | |
| *F16C 33/60* | (2006.01) | |

(52) U.S. Cl.
CPC ........ *F16C 33/7813* (2013.01); *F16C 19/386* (2013.01); *F16C 19/548* (2013.01); *F16C 33/60* (2013.01); *F16C 33/768* (2013.01); *F16C 33/783* (2013.01)

(58) Field of Classification Search
CPC ...... F16C 19/385; F16C 33/60; F16C 33/768; F16C 33/78; F16C 33/7813
See application file for complete search history.

(56) References Cited

U.S. PATENT DOCUMENTS

| | | | | |
|---|---|---|---|---|
| 4,692,040 A | * | 9/1987 | Ebaugh .................. | B21B 31/07 277/551 |
| 4,702,626 A | | 10/1987 | Scholl et al. | |
| 4,997,294 A | * | 3/1991 | Hillmann .............. | F16C 19/388 384/477 |
| 5,118,206 A | * | 6/1992 | Otto ...................... | F16C 19/385 384/477 |

(Continued)

FOREIGN PATENT DOCUMENTS

| | | |
|---|---|---|
| DE | 3915624 A1 | 11/1990 |
| EP | 1600349 A1 | 11/2005 |
| JP | 2007292230 A | 11/2007 |

(Continued)

*Primary Examiner* — Phillip A Johnson
(74) *Attorney, Agent, or Firm* — Bryan Peckjian; SKF USA Inc. Patent Dept.

(57) ABSTRACT

A sealing device for a bearing unit, where the unit has a radially outer ring, two rows of rolling bodies arranged, respectively, between the radially outer ring and a pair of radially inner rings. The sealing device further provides a spacer including an annular groove and configured to be arranged between the radially inner rings of the bearing unit and a seal housed inside the groove of the spacer. The seal is "U" shaped, defines a volume internally and is configured to be mounted in the annular groove with the concavity directed towards the axis of symmetry of the bearing unit.

9 Claims, 3 Drawing Sheets

(56) References Cited

U.S. PATENT DOCUMENTS 5,213,342 A * 5/1993 Weber ................... F16C 33/768
                                                            267/1.5
5,492,419 A * 2/1996 Miller ................... F16C 19/386
                                                            384/477

FOREIGN PATENT DOCUMENTS

JP          2008008424 A      1/2008
JP             4338116 B2    10/2009
WO     WO-2012069274 A1 *   5/2012   .............. F16C 19/52

* cited by examiner

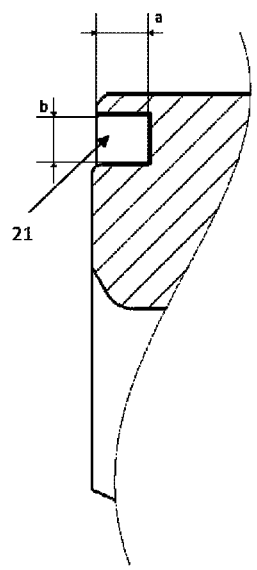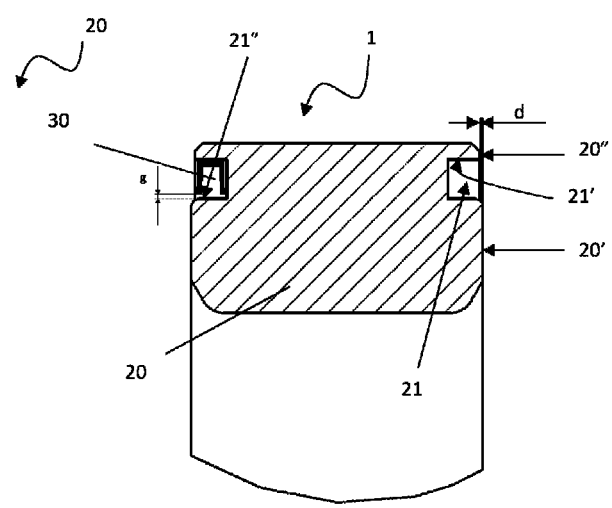
Fig. 3        Fig. 4
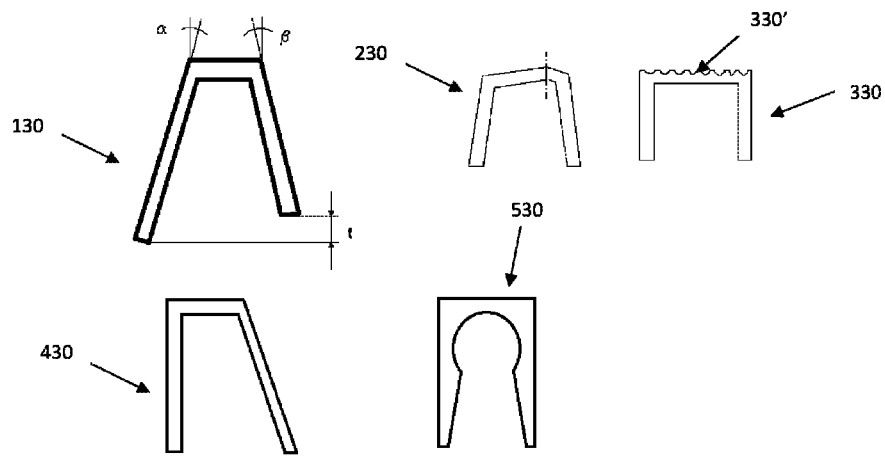
Fig. 5

SEALING DEVICE FOR ROLLING BEARING UNIT

CROSS REFERENCE TO RELATED APPLICATIONS

This application claims priority to Italian patent application no. 102015000048377 filed on Sep. 3, 2015, the contents of which are fully incorporated herein by reference.

FIELD OF THE INVENTION

The present invention relates to a sealing device for a rolling bearing unit with a double row of rolling bodies. The sealing device is housed between the two rows of rolling bodies and prevents contamination of the bearing grease by debris resulting from friction better known as "fretting". The invention is particularly, but not exclusively, suitable for bearing units provided with a central spacer and for railway, off-highway and industrial applications or for renewable energy systems.

BACKGROUND OF THE INVENTION

Sealing devices for preventing the contamination of the bearing grease by debris due to fretting are already known in the prior art. Fretting arises when two stationary metal bodies making contact nevertheless are subject to micro displacements relative to each other. The friction resulting therefrom releases iron powder debris which may contaminate the grease surrounding and lubricating the rolling bodies and the associated rolling tracks of the bearing. It is also known that, when the fretting debris contaminates the grease, the working life of the bearing is negatively affected by it, being reduced significantly. And obviously this absolutely fails to comply with the increasingly stringent specifications of rolling bearings, the specifications being intended to increase the technical and economic value of the product, requiring an increasingly longer working life. Various attempts have been made by the manufacturers of rolling bearings to overcome this drawback. For example, the document EP 1600349 A1 describes a seal mounted on a spacer axially arranged between a radially inner ring of a bearing and an element which generates the axial preload of the the inner ring; the document JP 4338116 B2 describes an anti-fretting device consisting of a polymer spacer inserted between the pair of inner rings of the bearing; the document JP 2008008424 A describes a seal formed by a composite spacer consisting of three components; finally, the document JP 2007292230 A describes a composite spacer. However, the solutions described in the cited documents have a high production cost and in some cases are also difficult to assemble. Moreover, where a polymer spacer is used, the axial play of the bearing becomes uncertain and this is damaging for the working life of the bearing.

BRIEF SUMMARY OF THE INVENTION

The object of the present invention is to provide a simple sealing device able to prevent the fretting debris from being able to reach the inside of the bearing, where the rolling bodies are housed, and contaminating the associated lubricating grease thereof. This is achieved by fitting a seal with a particular form—that of an overturned "U"—onto the central spacer arranged between the two inner races, the seal preventing contamination of the grease by the fretting debris and at the same time defining a volume inside which the debris may be housed. The technical problem is solved by simply forming two grooves in the spacers which are normally used in applications with two radially inner rings and by fitting the aforementioned seal inside the grooves.

According to the present invention a sealing device for a rolling bearing unit, having the characteristic features indicated in the attached independent claim, is therefore described.

Further preferred and/or particularly advantageous embodiments of the invention are described in accordance with the characteristic features indicated in the attached dependent claims.

BRIEF DESCRIPTION OF THE SEVERAL VIEWS OF THE DRAWING

The invention will now be described with reference to the attached drawings which illustrate a number of non-limiting examples of embodiment thereof, in which:

FIG. 3 is a detail of the groove of the spacer which houses the seal according to FIG. 2, FIG. 4 is another detail of the spacer with a seal assembled inside the groove of the spacer, FIG. 5 shows a plurality of alternative embodiments of the seal according to FIG. 2.

DETAILED DESCRIPTION OF THE INVENTION

Figure 1:
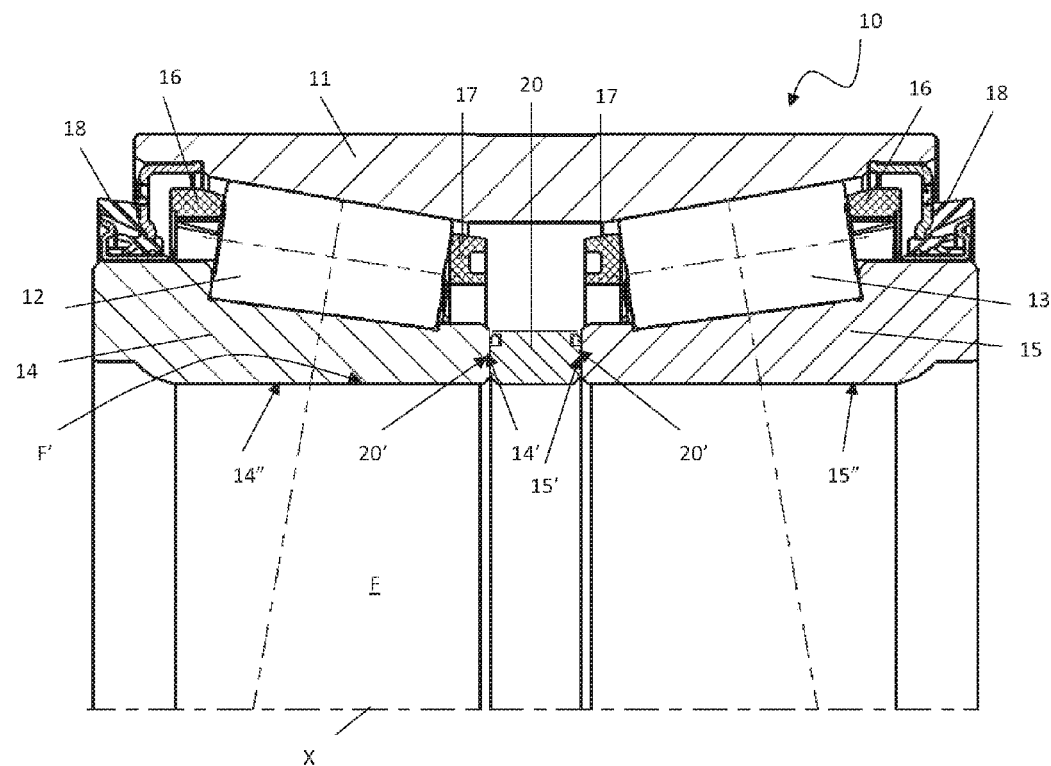
FIG. 1 is an axial-symmetric cross section through a bearing unit provided with the sealing device according to an embodiment of the present invention.

With reference now to FIG. 1, a bearing unit according to a preferred embodiment of the invention is indicated in its entirety by 10. As mentioned in the introduction, the invention is applicable not only to the configuration described below, but more generally to any bearing unit provided with at least two rings of rolling bodies and a central spacer arranged between the radially inner races.

In all of the present description and the claims, the terms and expressions indicating positions and orientations such as "radial" and "axial" are understood as being in relation to the central axis of rotation X of the bearing unit 10.

The bearing unit 10 provides a radially outer ring 11 and two rings of rolling bodies 12, 13, in this example tapered rollers, arranged, respectively, between the radially outer ring 11 and the radially inner rings 14, 15, fixed stably to a spindle F. The present invention is applicable both to bearing unit configurations with rotatable outer ring and stationary inner rings and to configurations with stationary outer ring and rotatable inner races. For the sake of easier graphical representation the reference numbers 12 and 13 will be attributed both to the single tapered rollers and to the entire row of rollers. Again for the sake of simplicity, the term "tapered roller" will be frequently employed, being used by way of example in the present description and in the attached drawings instead of the more generic term "rolling body" (and likewise the same reference numbers will also be used). It will be understood again that, instead of the tapered roller, any other rolling body may be used (for example, balls, cylindrical rollers, needle rollers, etc.).

The rolling bodies of the rings 12, 13 are kept in position by corresponding cages 16, 17 (in the example in the figure, the cage 16 for the row of rolling bodies 12 and the cage 17 for the row of rolling bodies 13) and the entire bearing unit is sealed from the outside by special seals 18, for example lip seals.

The radially inner rings are kept in their relative axial position by a spacer 20 which will be stationary, if the inner rings are also stationary, or rotatable, if the inner rings are also rotatable. In particular the inner annular surfaces 14' and 15' of the radially inner rings 14, 15 will be in contact with the annular surfaces 20' of the spacer 20. These surfaces, from a theoretical point of view, are not subject to movements relative to each other. In practice, however, as a result of the loads induced by the rolling bodies on the radially inner races, often relative micro displacements of the the surfaces occur, in particular relative micro rotations and/or micro displacements of the annular surfaces 14', 15' of the inner rings with respect to the annular surfaces 20' of the spacer. Similarly and for the same reasons, relative micro rotations may also be created between the inner cylindrical surfaces 14", 15" of the inner rings 14, 15 and the outer cylindrical surface F' of the spindle F.

These micro displacements, as already mentioned, by creating friction between the contact surfaces, generate the known phenomenon of fretting. The metal powder debris resulting from this friction is therefore free to move inside the bearing unit, affecting in particular the zone of the rolling bodies.

Figure 2:
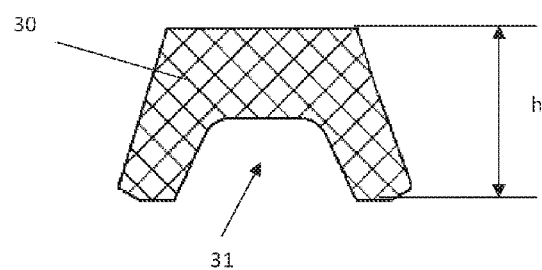
FIG. 2 is a detail of the seal according to FIG. 1.

According to another aspect of the present invention and with reference to FIGS. 2-4, this problem is solved using a sealing device 1 comprising the spacer 20 and at least one seal 30 characterized by an overturned "U" form, namely with the concavity 31 directed towards the axis X of the bearing unit. The seal, which is preferably made of elastomer material, is housed inside an annular groove 21 of the spacer 20. Obviously, it will be convenient to provide two grooves 21 in the spacer, each facing an inner race, and to house a seal 30 inside each groove 21.

The seal 30 is able in particular to prevent migration of the debris due to fretting from the spindle zone to the zone of the rolling bodies. A preferred embodiment of the seal 30 is that shown in FIG. 2, but, as will be seen below, other forms are possible, while maintaining the overturned "U" configuration. This particular form, in fact, has been devised for a dual purpose: in fact, the seal not only stops the movement of the debris towards the inside of the bearing unit, but, owing to the internal volume defined by the concavity 31 directed towards the axis X of the bearing, it is also able to accumulate the debris inside it. In this way the debris can in any case be prevented from damaging the inner rings of the bearing.

The groove 21 of the spacer may be advantageously provided with characteristics which improve the housing of the seal 30 and in general the behavior of the sealing device. In particular, in order to prevent oscillating movements of the seal 30 inside the groove 21, the latter may be provided with a radially outer cylindrical surface 21' having a high degree of roughness. Moreover, the groove is preferably formed so that, between the annular surfaces of the spacer, i.e. the radially inner surface 20' and the radially outer surface 20", there is a difference 2d between the relative lengths. In other words, the radially outer surface 20" must be a half length smaller, by the value d, than the half length of the radially inner surface 20'. As a result of this measure it is possible to avoid friction and consequent debris from fretting between the annular surface 20" of the spacer and the annular surfaces 14' and 15' of the radially inner rings of the bearing. In this way the phenomenon of fretting is prevented in a zone downstream of the seal 30, where clearly the same seal could no longer be effective Moreover, the groove 21 conveniently has a ratio between depth a and height b which is greater than 1 so as to improve the stability of the seal inside the groove during the operations for mounting and transportation of the sealing device.

Moreover, the height wise dimension h of the seal 30 must be advantageously smaller than the height b of the groove 21 so as to leave gap g in the vicinity of the radially inner cylindrical surface 21" of the groove 21 which allows the fretting debris to enter and fill the internal volume of the seal 30.

With reference to FIG. 5 this shows a plurality of possible embodiments of the seal 130, 230, 330, 430, 530. Clearly all the embodiments of the seal have in any case the form of an overturned "U", namely with the concavity directed towards the axis X of the bearing. In particular, the seal 130 has an asymmetrical form of the legs of the "U" so as to leave a wide gap t (which is added to the gap g defined above) and makes it easy for the debris to enter inside the volume defined by the concavity of the seal. The inclined portions of the "U" form, which define with respect to the radial direction respective angles $\alpha$ and $\beta$ (with a value the same or different from each other), allow instead easier assembly of the seal inside the groove of the spacer. The seals 230, 430, which are formed as an overturned but asymmetrical "U", as well as the seal 330, which has a particularly rough outer cylindrical surface 330', are especially designed so that they cannot come out of the groove of the spacer. Finally, the seal 530 has a concavity in the form of a keyhole and this measure optimizes the internal volume and therefore the amount of debris which may be contained inside it.

Figure 6:
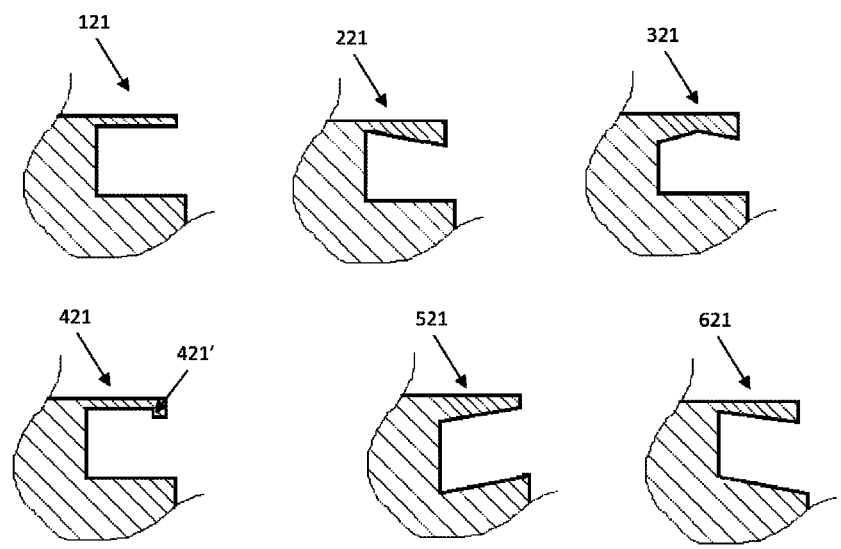
FIG. 6 shows a plurality of alternative embodiments of the groove of the spacer.

FIG. 6, finally, shows a plurality of possible embodiments of the groove 121, 221, 321, 421, 521, 621. For the grooves also, the design has always been chosen to define geometries which may favor assembly and prevent the seal from coming out during assembly and subsequent transportation. And this is achieved in particular by using grooves with an asymmetrical geometry 221, 521, 621 or by providing a projection 421' in the configuration 421. Each embodiment of the seal, whether it be the configuration 30 shown in FIG. 2 or those shown in FIG. 5, may be used in any embodiment of the groove, be it the configuration 21 shown in FIGS. 3-4 or one of the configurations shown in FIG. 6. Any forms of the seal and forms of the groove which have any combination of characteristics obtainable from the examples shown may also be used.

The subject of the present invention therefore solves the problem caused by fretting in rolling bearings in a very simple and low-cost manner: it is merely required to add two seals to the spacers normally used, these requiring only the further machining of the two grooves. The seals have been designed with the characteristic form of an overturned "U" which, at the same time, not only prevents the fretting debris from reaching the zone of the rolling bodies, but also provides a volume able to house the debris, preventing it from damaging the essential components of the bearing. The seals are made of elastomer or plastic or similar material so as to compensate for any deformations of the inner races.

This solution allows the working life of the bearing to be increased, without having to use particular materials, and on the contrary using relatively low-cost and highly machinable steels for the spacer. The spacer in this way may be easily machined in order to determine the correct axial play and may be reused several times, requiring only replacement of the two seals.

In addition to the embodiments of the invention, as described above, it is to be understood that numerous further variants exist. It must also be understood that the embodiments are only examples and do not limit the subject of the invention, nor its applications, nor its possible configurations. On the contrary, although the description provided above enables the person skilled in the art to implement the present invention at least in one of its examples of configuration, it must be understood that numerous variations of the components described are conceivable, without thereby departing from the scope of the invention, as defined in the accompanying claims, interpreted literally and/or in accordance with their legal equivalents.

The invention claimed is:

1. A sealing device for a bearing unit, the unit providing a radially outer ring, two rows of rolling bodies arranged, respectively, between the radially outer ring and a pair of radially inner rings, the sealing device comprising:
   a spacer provided with at least one annular groove and arranged between the radially inner rings of the bearing unit,
   at least one seal housed inside the at least one groove of the spacer, wherein
   the seal is "U" shaped, the seal defines an internal volume and is configured to be mounted inside the annular groove with the concavity directed towards the axis of symmetry of the bearing unit.

2. The sealing device according to claim 1, wherein the difference between the half lengths of a radially outer annular surface of the spacer and a radially inner annular surface of the spacer is equal to a predetermined value (d).

3. The sealing device according to claim 1, wherein the annular groove has a ratio between a depth (a) and a height (b) that is greater than one.

4. The sealing device according to claim 3, wherein the height (h) of the seal is smaller than the height (b) of the groove.

5. The sealing device according to claim 1, wherein the annular groove is provided with a rough radially outer cylindrical surface.

6. The sealing device according to claim 1, wherein the seal is asymmetrically "U" shaped.

7. The sealing device according to claim 1, wherein the seal has a roughened outer cylindrical surface.

8. The sealing device according to claim 1, wherein the seal has a concavity in the form of a keyhole.

9. A bearing unit comprising:
   a radially outer race,
   two rows of rolling bodies arranged, respectively, between the radially outer ring,
   a pair of radially inner rings, and
   a sealing device having a spacer provided with at least one annular groove and arranged between the radially inner rings of the bearing unit,
   at least one seal housed inside the at least one groove of the spacer, wherein
   the seal is "U" shaped, the seal defines an internal volume and is configured to be mounted inside the annular groove with the concavity directed towards the axis of symmetry of the bearing unit, and is arranged in a central position between the radially inner rings.

* * * * *